June 18, 1968

J. E. CLARKE 3,388,413

HYDRAULIC DOCK RAMP CONTROLS

Filed April 11, 1966

Inventor
Jesse E. Clarke
By Darbo, Robertson
& Vandenburgh Att'y's

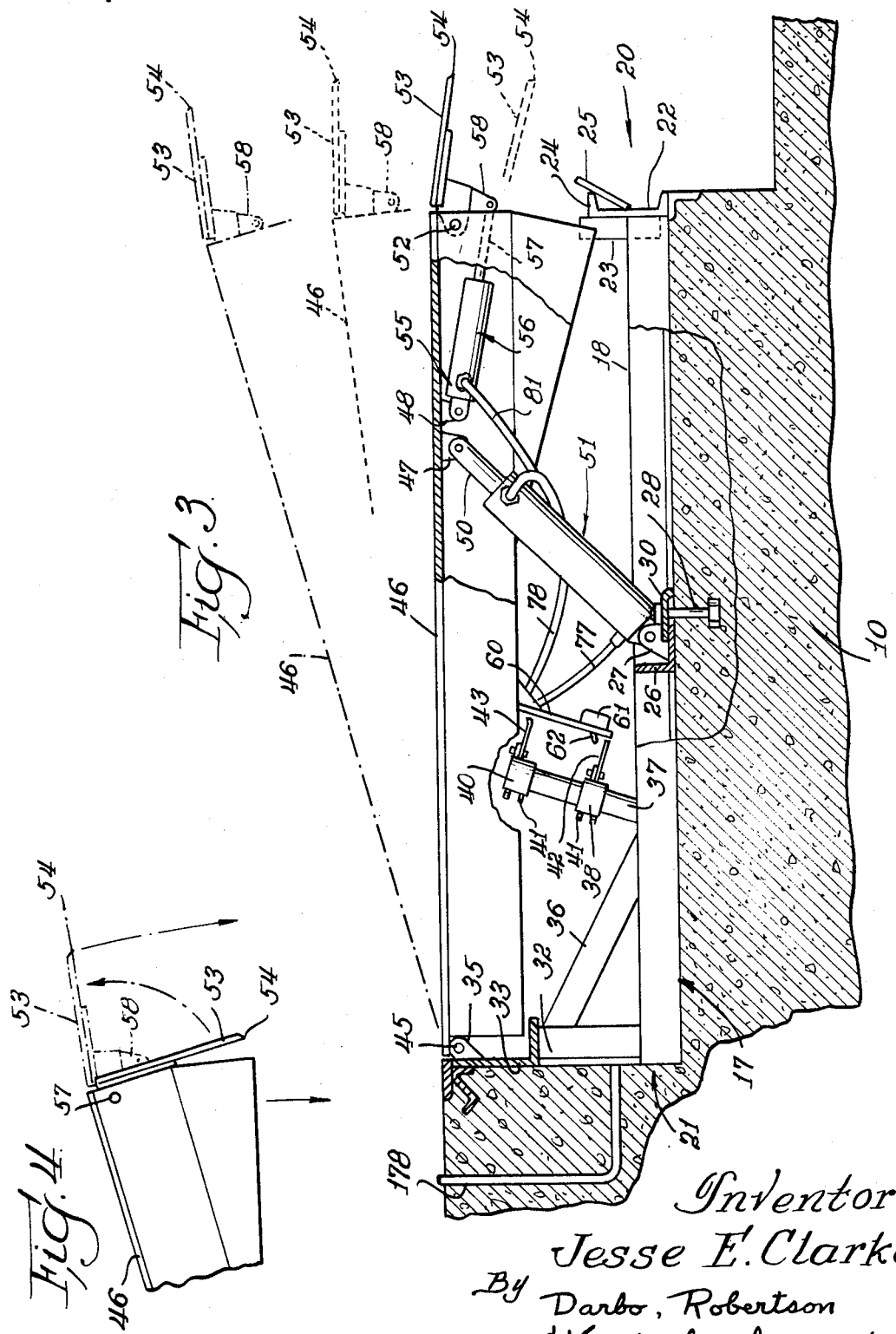

June 18, 1968 J. E. CLARKE 3,388,413
HYDRAULIC DOCK RAMP CONTROLS
Filed April 11, 1966 3 Sheets-Sheet 3

Inventor
Jesse E. Clarke
By Darbo, Robertson
& Vandenburgh Attys

United States Patent Office 3,388,413
Patented June 18, 1968

3,388,413
HYDRAULIC DOCK RAMP CONTROLS
Jesse E. Clarke, Hinsdale, Ill., assignor to Autoquip Corporation, Chicago, Ill., a corporation of Illinois
Filed Apr. 11, 1966, Ser. No. 541,626
9 Claims. (Cl. 14—71)

ABSTRACT OF THE DISCLOSURE

Control apparatus is provided for a dock ramp having a first hydraulic cylinder to raise and lower the ramp and a second hydraulic cylinder to pivotally position a ramp lip with respect to the ramp. The hydraulic fluid supply motor is actuated by a manual switch and in response to the supply of hydraulic fluid a control valve assembly directs hydraulic fluid to the ramp cylinder. When the ramp cylinder has reached the end of its stroke and hydraulic pressure commences building up in the line leading thereto the relief valve opens to direct the flow of hydraulic fluid to the lip cylinder. When the lip cylinder reaches the end of its stroke and the motor switch is opened the hydraulic control valve assembly drains the hydraulic fluid from the ramp cylinder permitting the ramp to settle so that the lip rests on the truck bed. When the truck pulls away the ramp cylinder continues to drain until the ramp settles to a below normal position, at which time an electrical switch again turns the hydraulic pump motor on to raise the ramp. As this is occurring the lip cylinder drains and after the ramp cylinder reaches a predetermined extension it in turn drains so that the ramp and lowered lip return to the normal position.

Background of the invention

This invention relates generally to controls for a hydraulic elevating device, and more particularly to hydraulic valving for use in a hydraulic dock ramp having an extendible lip.

Hydraulic dock ramps of this variety are usually installed in a pit provided in a dock so as to form an integral part of the dock when retracted and not in use. Such ramps are usually equipped with an extendible lip which is retracted or folded down when the dock ramp is not in use so as to pleasingly blend in with the lines of the dock and not create an outwardly projecting hazard to objects moving in the vicinity thereof.

In using this type of ramp, a truck or other vehicle is backed up to the dock or otherwise positioned adjacent thereto. A dock ramp operator then closes an electrical switch which starts a motor driven pump. The pump drives fluid into a ramp cylinder which pivots the ramp upwardly from an initial horizontal position. This initial position is usually flush with the dock platform and below the level of the truck floor. As the outer or free end of the dock approaches its maximum height, this being above the level of the vehicle floor, the lip is automatically extended outwardly so as to become generally vertically aligned above the adjacent edge of the vehicle floor. The ramp then automatically lowers until the lip rests on this adjacent edge. The ramp is then in a position to facilitate loading or unloading of the vehicle. After the vehicle is loaded or unloaded, it merely moves away from the dock ramp, and the ramp automatically returns to its initial horizontal position.

One commercial hydraulic dock ramp performs these movements by the use of a four way valve which controls the flow of fluid in its hydraulic system. Each of the valves is opened and closed by a solenoid which is in turn controlled by limit switches. This type of system is not only unnecessarily complex and expensive, but also the switches and solenoids have been found to be the most vulnerable parts of the system, thereby requiring considerable servicing and parts replacement. The present invention entirely eliminates the use of solenoid operated valving and incorporates only a single limit switch.

It is therefore a general object and an advantage of this invention to provide an improved control system for a hydraulic dock ramp which does not require the use of solenoids.

Another advantage and a feature of the present invention resides in the use of a single valve assembly which entirely controls all hydraulic fluid flow within the system.

Other objects and advantages of the invention will be apparent from the following description when taken in conjunction with the following drawings, wherein:

FIG. 3 is a side elevation, partly in cross section of the dock ramp assembly shown in FIG. 1 and shows the ramp in its lowermost position, various inclined positions of the ramp being shown with dashed lines;

FIG. 4 is a fragmentary view of the lip portion of FIG. 3 showing the limits of movement of the extendible lip thereon;

FIG. 5 is a cross sectional view of the control valve assembly used to control the flow of hydraulic fluid in the hydraulic system and shows the various components therein in a position corresponding to a condition where the motor is not running;

Figure 1:
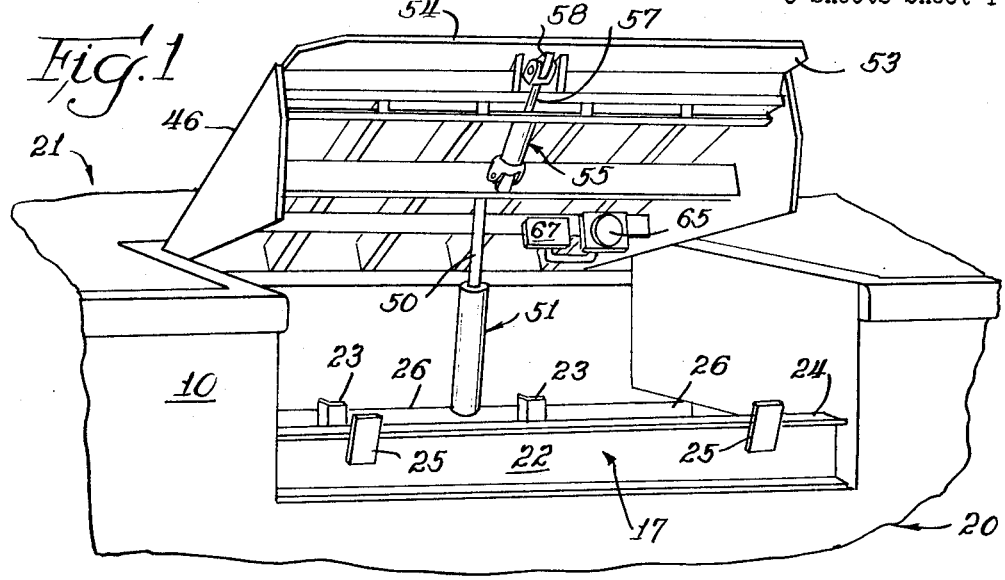
FIG. 1 is a front perspective view of a dock ramp assembly incorporating the principles of the present invention and shows the assembly installed in a standard dock pit, the ramp portion being inclined upwardly and the lip extended to more clearly show its construction.

FIG. 6 is a cross sectional view of the control valve assembly taken substantially along the lines 6—6 of FIG. 5; and FIG. 7 is a fragmentary cross sectional view of the control valve assembly shown in FIGS. 5 and 6, this view being substantially the same as FIG. 5 but showing the placement of various internal components in their positions corresponding to a condition during which the pump is operating and the lip is being extended.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Referring now to the drawings in more detail, the dock ramp unit is shown installed in a pit provided therefor in a dock 10 of concrete or other suitable material. The entire dock ramp unit may be thought of generally as including a structural assembly 12 which forms the basic kinematic mechanism, a hydraulic system 14, and an electrical circuit 16 (reference being made to FIG. 2).

Structural assembly 12 includes a supporting base 17 rigidly secured within the dock pit and formed by a plurality of structural members welded together. These members include a pair of elongate and horizontal angle irons 18 extending generally from the front 20 to the rear 21 of the dock pit along each lateral side thereof. These are connected at their front portions by a laterally extending channel member 22. Welded to the rear surface of channel member 22 between angle irons 21 are a pair of lip stops 23 which extend above the uppermost surface 24 of channel member 22. Welded to the front portions of channel member 22, and extending upwardy and forwardly therefrom, are a pair of lip guides 25.

Extending laterally between the mid-portions of angle irons 21 is a transverse angle iron 26 having a mounting lug 27 welded thereto at its mid-portion. A pair of bolts 28 imbedded in the dock at the bottom of the pit provides rigid anchoring means for a plurality of clamps 30 which are tightened against transverse angle iron 26 to thereby rigidly lock supporting base 17 within the dock pit.

Extending upwardly from the rear portions of each of angle irons 18 is a short length 32 of angle iron which provides a rigid base for a horizontal and transversely extending member 33 extending therebetween and carrying pivot pin connections or lugs 35. Each of the short angle irons 32 is further supported in its vertical position by means of a bracing member 36.

Also welded to one of the angle irons 18, and extending generally upwardly and slightly forwardly therefrom, is a rigid arm 37 carrying a pair of brackets 38 and 40 thereon. Each of brackets 38 and 40 may be locked at any desired height along arm 37 by means of set screws 41. Lower bracket 38 rigidly carries a generally forwardly extending flexible finger 42, and upper bracket 40 rigidly carries a generally forwardly extending and flexible finger 43.

Pivotally mounted to lugs 35 by means of pivot pins 45 is a generally forwardly extending ramp 46. Ramp 46 is welded together as a unit from structural steel components, and is designed to support substantial loads. Welded to its undersurface are a pair of spaced pivot pin mounting lugs 47 and 48 which are centered generally between the sides of the ramp.

Pivotally connected to mounting lug 47 is the shaft portion 50 of a hydraulic ramp cylinder assembly 51. The lower cylinder portions of assembly 51 are pivotally connected to mounting lug 27 on the transverse angle iron 26 which forms a part of the supporting base 20. Ramp cylinder assembly 51 provides the means by which the ramp 46 is pivoted between a generally horizontal position and an inclined or raised position. It will be understood that cylinder 51 not only forms a structural member in the dock ramp assembly mechanism, but also forms a component of the hydraulic system.

Pivotally connected to the front edge portions of the ramp 46, as by pivot pin 52, is an extendible lip 53. Lip 53 has an outermost edge 54 which rests on uppermost surface 24 of channel member 22 when the ramp is not in use. Pivotal movement of lip 53 relative to ramp 46 is accomplished by means of a hydraulic lip cylinder assembly 55. The cylinder portion 56 of lip cylinder assembly 55 is pinned to mounting lug 48 under ramp 46, and the shaft portion 57 is pivotally connected to a lug 58 on the lip 53. As with ramp cylinder assembly 51, lip cylinder assembly 55 forms a component both of the structural assembly 12 and the hydraulic system 14.

Fixably attached to ramp 46, and depending therefrom, is an arm 60. Attached to arm 60 is an electrical switch box 61 having a rearwardly protruding switch element 62 which is engaged by flexible fingers 42 and 43 when ramp 46 is inclined at some predetermined inclination. Switch element 62 forms a part of a limit switch 63.

The subject matter of the invention is concerned principally with the hydraulic system which controls the movements of ramp 46 and lip 53, and this system will be described hereinbelow.

Hydraulic control system 14 includes generally a motor driven pump 65, a reservoir 66, a control valve assembly 67, ramp cylinder assembly 51, and lip cylinder assembly 55.

Pump 65 draws hydraulic fluid from reservoir 66 through a feed line 68 having a strainer 70 interposed therein. Fluid from the pump is forced under pressure through a high pressure line 71 to the control valve assembly 67. A relief valve 72 is connected between lines 68 and 71 (and in parallel with pump 65) to prevent injury to the motor driven pump.

Extending outwardly from control valve assembly 67 is a ramp cylinder line 73 having a check valve 75 and a manually variable restriction 76 connected in parallel therealong. Line 73 then divides into two lines 77 and 78, the former connecting into cylinder 51 on one side of the piston therein, and the latter connecting into cylinder 51 on the other side of the piston. Line 77 includes a standard velocity fuse 80 as a safety feature.

Extending between and connected to control valve assembly 67 and lip cylinder assembly 55 is a lip cylinder line 81. A strainer 82 interposed in line 81 restricts the movement of foreign particle inclusions therealong.

Extending between control valve assembly 67 and reservoir 66 is a reservoir line 83 having its reservoir end connecting into the reservoir below the hydraulic fluid level.

The movement of all fluid within the hydraulic system is controlled by control valve assembly 67, shown in detail in FIGS. 5–7 and to be described next.

Control valve assembly 67 includes a main body in the form of a rectangular block 85 of some suitable material such as aluminum. Although assembly 67 may be mounted to the ramp in any one of a number of arbitrary orientations, it will be described in terms of the orientation as shown in FIGS. 5 and 7 for convenience. The block includes an upper surface 86, a lower surface 87, a left side surface 88, a right side surface 89, a front surface 90, and a rear surface 91. A pair of mounting holes 92 extend through the block between its front and rear surfaces to permit its being mounted in a convenient location, such as to the underside of the ramp 46.

Block or housing 85 contains an interconnecting network of fluid passageways which are formed by appropriate machining operations. It will be understood that other methods of producing the housing 85, such as casting or extruding, are fully equivalent to the machined block 85.

Extending generally between left and right sidewalls 88 and 89 is an elongate and cylindrical spool valve passageway 95 having a first end portion 96 and a second end portion 97. Contained within spool valve passageway 95 are movable valve means in the form of an elongate and slideable spool valve generally 100 having a first cylindrical spool 101, a second cylindrical spool 102, and a third cylindrical 103, each of these spools being in axial alignment with one another and spaced apart. Spools 101 and 102 are connected in their spaced apart relationship by means of a relatively small diameter shaft 105 extending therebetween, and spools 102 and 103 are held spaced apart by a relatively small diameter shaft 106. Extending axially outwardly from spool 103 toward the right sidewall 89 of the control valve assembly is a relatively small diameter shaft 107. Shaft 107 serves both to limit the sliding movement of the spool valve 100 toward the right sidewall 89 as well as providing a support for biasing means in the form of a compression spring 108 which tends to bias the spool valve toward the left sidewall 88. Movement of the spool valve toward the left sidewall is limited by means of a bolt 110 which also serves to seal off end portion 96 from the atmosphere in conjunction with a sealing washer 111. A bolt 112 having a bore 113 therein in its inwardly facing end serves to limit movement of the spool valve toward the right sidewall 89, and also seals the second end portion 97 from the atmosphere in conjunction with sealing washer 115.

Extending into block 85 from its rear surface 91 is a high pressure inlet passageway 116 which is threaded at its outermost end to receive the threaded end fitting of the high pressure line 71. Inlet line 116 divides into a first branch 117 and a second branch 118. First branch 117 extends generally parallel to and behind spool valve passageway 95 into which it ultimately connects at its first end portion 96 by way of a cross bore 119. Second branch 118 connects directly with the second end portion 97 of the spool valve passage. Threaded plugs 120 serve to seal off the drilled holes which form first branch 117.

Extending through the block between its upper surface 86 and its lower surface 87 is a cylinder communication passageway 121 which intersects spool valve passageway 95 generally at its mid-portions and is sealed off at its bottommost end by means of a threaded plug 122. Lower portions 123 of communication passageway 121 are intersected by a ramp cylinder passageway 125 extending below and parallel to spool valve passageway 95. The outermost end 126 of ramp cylinder passageway 125 is threaded to receive the end fitting 127 of the ramp cylinder line 73. End fitting 127 desirably carries a strainer 128 therewith which extends into ramp cylinder passageway 125 to strain out any foreign particles inclusions in the hydraulic fluid. A pressure equalization passageway 130 connects the extreme right end portion 97 of spool valve passageway 95 with ramp cylinder passageway 125, and its lowermost end is sealed by means of a bolt 131 and sealing washer 132.

Upper portions 13 of cylinder communication passageway 121 fixably carries a threaded insert 135 having an elongate and axial hole 136 therethrough forming a valve seat for a check valve generally 137. Check valve 137 also includes a ball closure 138 and closure biasing means in the form of a compression spring 140. Fixed end 141 of spring 140 rests against a spring pre-load adjustment screw 142 screwed into threads provided therefor in the uppermost end of passageway portions 133. After adjustment screw 142 is screwed into portions 133 the desired depth, it is locked in this position by means of a lock nut 143. Passageway portions 133 provide a portion of a lip cylinder inlet passageway which permits hydraulic fluid to flow into the lip cylinder and extend the lip 53.

Extending into block 85 from its upper left side surface 88 is a lip cylinder communication passageway 145 which intersects portions 133 of the lip cylinder inlet passageway. The outermost or left end 146 of passageway 145 is threaded to receive the threaded end of lip cylinder line 81. Passageway 145 carries an elongate and slideably movable closure member 147 having an elongate axial hole 148 therethrough. Closure member 147 is biased to the right or toward the innermost end of passageway 145 by means of a compression spring 150.

Connecting the mid-portions of lip cylinder communication passageway 145 with the mid-portions of the spool valve passageway 95 is a lip cylinder drain passageway 151 having upper portions 152 and lower portions 153. The outermost end of upper portions 152 are sealed off by means of a threaded bolt 155 and sealing washer 156. Lower portions 153 include a check valve generally 157 to provide drainage from the lip cylinder 55 in case of an overload on the lip 53. Check valve 157 includes a threaded insert 158 having an axial hole 160 extending therethrough, a ball closure 161, and closure biasing means in the form of a compression spring 162. Spring 162 is preloaded by means of a preload adjusting screw 163 which is locked in place at its proper depth by means of a nut 165. Adjusting screw 163 also serves to seal off the outermost or lowermost end of passageway portions 153.

Extending upwardly into block 85 from its bottom surface 87 is a reservoir passageway 166 which intersects the mid-portions of spool valve passageway 95. The outermost end of reservoir passageway 166 is threaded as at 167 to receive the threaded end of reservoir line 83. A passageway 168 extends into block 85 from its lower left side surface 88 and connects lower portions 153 of the lip cylinder drain passageway with reservoir passageway 166. The outermost or left end of passageway 168 is threaded to receive a bolt 170 and sealing washer 171 to seal off this end.

While the positions of the spools on the spool valve 100 relative to the intersection of various passageways with the spool valve passageway 95 is important in the operation of the control valve assembly, the placement and limits of movement of these spools will be described in detail in conjunction with the operation of the hydraulic system.

Figure 2:
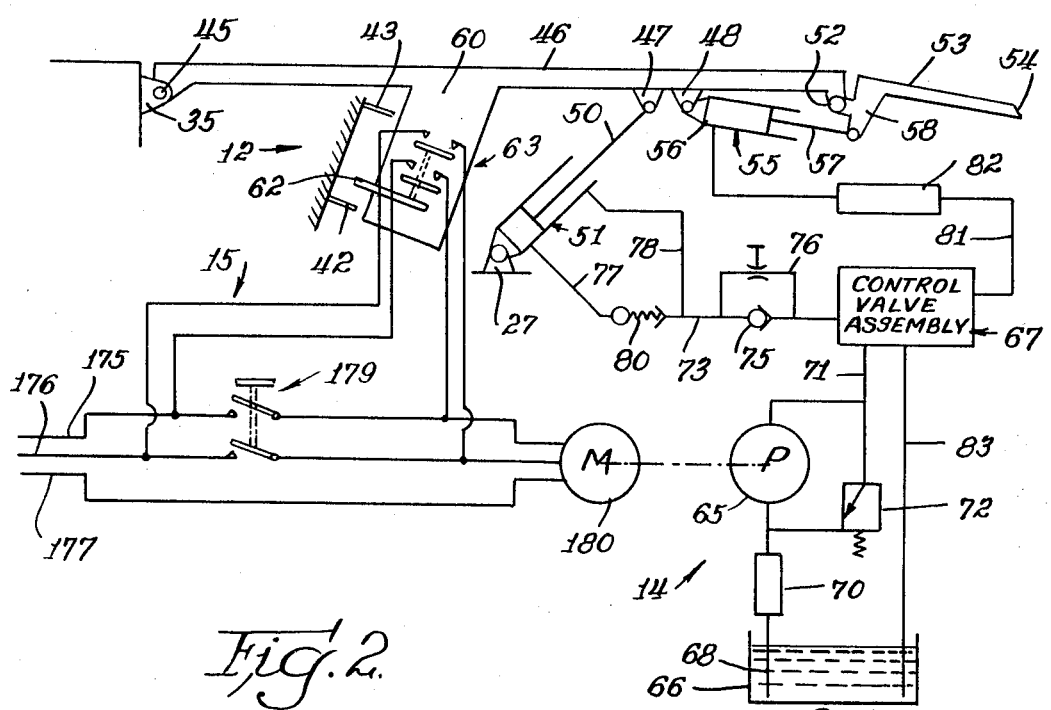
FIG. 2 is a schematic diagram of the dock ramp and control system therefor, but with the main control valving shown herein simply as a rectangle inasmuch as it is the subject of several other detailed figures.

The electrical circuitry, shown best in FIG. 2, is connected to a standard source of available commercial power. Although any source of power could be utilized, the drawings show a conventional three-phase, 220 volt hookup. Electrical power is supplied through three wires 175, 176 and 177, these wires being threaded through a length of conduit 178 imbedded in the dock 10. Two of these wires, herein 175 and 176, include an operator controlled switch 179 connected in parallel with limit switch 63. Either switch when closed causes a motor 180 to run which drives motor driven pump 65.

In describing the operation of the dock ramp, an overall description of operation will first be presented, and a detailed description of the operation of specific components will follow thereafter.

After a truck or other vehicle has backed up to the dock adjacent the dock ramp, the dock ramp operator closes switch 179 to start motor 180 and cause motor driven pump 65 to drive high pressure hydraulic fluid through control valve assembly 67, through ramp cylinder line 73, and through line 77 into the ramp cylinder assembly 51. Ramp 46 then pivots upwardly toward its uppermost position. Upon reaching its uppermost position, control valve assembly 67 diverts the fluid flow therethrough into lip cylinder assembly 55 by way of lip cylinder line 81. When the lip 53 is fully extended to its generally horizontal position, the operator stops motor 180 by manual switch 179. Control valve assembly 67 inherently prevents fluid flow out of lip cylinder 55 but opens ramp cylinder line 73 to the reservoir line 83, thereby permitting ramp 46 to lower with the lip 53 extended. Extended lip 53 settles until it eventually engages the top rear edge of the truck floor, and the ramp 46 may then be used to transport items between the dock 10 and the truck. As the height of the truck floor varies due to the change in load thereon, the open line between the ramp cylinder 51 and the reservoir 66 permits the ramp 46 to pivot accordingly so that the lip 53 always remains flush with the floor of the truck.

When the loading or unloading operation is complete, the truck merely pulls away from the dock, and the ramp 46 pivots downwardly with the lip 53 still extended. Since the outermost edge 54 of the lip 53 would otherwise normally rest on the upper surface 24 of channel member 22 to support the ramp 46 in a horizontal position flush with the upper surface of the dock, the extended lip does not provide a stop and ramp 46 continues pivoting slightly below the level of the dock. Switch element 62 of limit switch 63 is then engaged by the lower flexible finger 42. This closes the electrical circuit to motor 180 which once again causes ramp 46 to be driven upwardly. As ramp 46 pivots upwardly, control assembly 67 automatically opens the line between lip cylinder assembly 55 and reservoir 66, thereby permitting the lip 53 to pivot downwardly to its initial or retracted position. Prior to the ramp 46 reaching its uppermost tilted position, switch element 62 of limit switch 63 engages upper flexible finger 43 which opens the electrical circuit and stops motor 180 The ramp 46, along with retracted lip 53, then settled back to their initial position with edge 54 of lip 53 resting on the uppermost surface of channel member 22. It is thus seen that lowering of the ramp to its initial position is completely automatic, the operator needed only to raise the ramp prior to its use.

More specifically, and assuming the dock ramp is in its initial lowered position, the positions of the parts within control valve assembly 67 are substantially as shown in FIGS. 5 and 6. When the dock ramp operator closes the electrical circuit by means of switch 179 (limit switch 63 being open), motor 180 drives motor driven pump 65 which pumps hydraulic fluid into the control valve assembly 67 by way of high pressure pump line 71 (see particularly FIG. 6). This pressurized fluid enters control valve 67 by way of high pressure inlet passageway 116. Although spool 103 initially blocks fluid flow from second branch 118 into spool valve passage 95, the inlet pressure is exerted against the left end of spool 101 by way of first branch 117. This pressure drives spool valve 100 to the right against the lesser bias of compression spring 108 to the position shown generally in FIG. 7. In this position spool 103 partially exposes second branch 118 to spool valve passage 95 and permits fluid flow into restricted mid-portions of the spool valve passageway between spools 102 and 103 in their new positions. From there the fluid flows into ramp cylinder assembly 51 by way of cylinder communication passageway portions 123, ramp cylinder passageway 125, ramp cylinder line 73, and line 77. This causes ramp 46 to pivot upward towards its uppermost position.

It will be noted that the fluid pressure in ramp cylinder passageway 125 is less than that in first branch 117 because of the throttling loss experienced as the fluid passes from second branch 118 into spool valve passageway 95. This lower pressure is exerted against the right end of spool 103 by way of pressure equalization passageway 130, but the force created thereby is overcome by the oppositely directed force against the left end of spool 101 as caused by the higher pressure in first branch 117. The net effect of these two forces and the force set up by compression spring 108 is to cause spool valve 100 to adjust its lateral position so as to cause a predetermined pressure drop from second branch 118 to spool valve passageway 95.

When the ramp 46 reaches its uppermost position, the fluid in cylinder communication passageway 121 momentarily has nowhere to go and therefore raises in pressure. This increased pressure, though still less than that in second branch 118, is sufficient to unseat ball closure 138 and permit the fluid to flow into upper portion 133 of passageway 121. This pressure is exerted against the right end of slidable closure member 147, as fluid flows through axial hole 148, and the force created thereby causes member 147 to move to the left against the bias of compression spring 150, substantially as shown in solid lines in FIG. 7. In this position member 147 closes off lip cylinder drain passageway 151. The hydraulic fluid then flows into lip cylinder assembly 55 by way of lip cylinder line 81. The lip 53 then pivots toward its extended position. Slideable closure member 147 remains in its leftmost position during extending of the lip 53 by virtue of the pressure loss through axial hole 148 which creates a pressure differential on each end of the closure member overcoming the oppositely directed force exerted by spring 150. After the lip 53 reaches its extended position, the operator turns off motor 180 by means of switch 178. If the operator does not turn off the switch immediately, or if the ramp experiences some overload during its travel, relief valve 72 protects the motor 180 from injury.

After the lip 53 is entirely extended, the pressure on each end of slideable closure member 147 is equalized. Compression spring 150 then drives slideable closure member 147 back to its initial position as shown in FIG. 5. Also, no differential fluid force is exerted on spool valve 100, thereby permitting compression spring 108 to drive spool valve 100 back to its initial position substantially as shown in FIGS. 5 and 6. In this position the fluid in lip cylinder 54 is trapped by virtue of the placement of spool 101, spool 102, and check valve 137. Check valve 157 does not open and permit drainage because it is set to open only at high overload pressures.

However, the positions of spools 102 and 103 are now such as to permit fluid communication between lower portions 123 of cylinder communication passageway 121 and reservoir passageway 166. Therefore, the fluid in ramp cylinder 51 flows into reservoir 66 under the weight of the ramp 46, thereby causing the ramp 46 to settle downwardly with the lip 53 extended. Lip 53 then comes to rest on the upper adjacent surface of the truck floor, and the ramp is in position to permit loading or unloading of the truck.

As mentioned earlier, the ramp and lip return to their initial positions automatically without assistance from the dock operator. When the truck moves away, so as to pull out from under lip 53, ramp 46 continues its downward journey. Lip 53 remains extended by virtue of the position of spool valve 100. With the lip extended, its outermost edge 54 cannot come to rest on the uppermost edge 24 of channel member 22; and therefore, ramp 46 pivots downwardly beyond its initial horizontal position. This additional downward movement permits lower flexible finger 43 to engage switch element 62 of limit switch 63 and close electrical circuit 16. Motor 180 then starts once again.

Again the fluid pressure in first branch 117 drives spool valve 100 to the right against the bias of compression spring 108. As before, the ramp 46 begins to raise as fluid fills ramp cylinder 51. Also as before, slidable closure member 147 is in its initial position as shown in FIG. 5. In these positions there exists an open line between lip cylinder assembly 55 and reservoir 66. The weight of the lip 53 then acts to drive the fluid out of the lip cylinder assembly 55 into the reservoir 66. It can thus be seen that as the ramp 46 raises, lip 53 lowers or retracts.

Before the ramp 46 reaches its uppermost position, switch element 62 of limit switch 63 engages upper flexible finger 42 which opens the circuit 16. Inasmuch as switch 179 is also open, motor 180 stops, spool valve 100 moves to the left, and the fluid in ramp cylinder assembly 51 drains into reservoir 66 by way of spool passageway 95. Ramp 46 then settles downwardly until outermost edge 54 of lip 53 comes to rest against the uppermost surface of channel member 22 positioning the ramp 46 flush with the dock 10 at which position limit switch 63 will not be actuated.

In the event the truck inadvertently pulls away from under lip 53 when a substantial load remains on the dock 46, fluid flows out of ramp cylinder assembly 51 at a greater than normal rate. Velocity fuse 80 then acts to close line 77 and prevent further descent of ramp 46 until this load is removed.

Although the invention has been described as mounted in a dock and being used principally to facilitate the loading and unloading the trucks, it will be understood that other applications are contemplated. For example, it might be desirable to use the invention in a portable form, and the loading and unloading of other forms of vehicles is possible, such as ships.

I claim:

1. In a hydraulic dock ramp unit having a pivotal ramp with an extendible lip thereon for facilitating the loading and unloading of a vehicle, said dock ramp unit including a source of high pressure hydraulic fluid, a ramp cylinder for raising and lowering the ramp, a lip cylinder for extending and retracting the lip, a hydraulic fluid reservoir, and valving for controlling the movements of the ramp and lip, the improvement comprising: means moveably responsive to the input of high pressure hydraulic fluid for permitting flowing thereof into the ramp cylinder and for preventing flow therefrom into the reservoir; means directly responsive to the increase in hydraulic fluid pressure incident to the dock ramp cylinder reaching its maximum extended position to allow the hydraulic fluid input into the lip cylinder to extend the lip; and means causing fluid communication between the ramp cylinder and the reservoir after said lip is extended for permitting said dock ramp to lower with the lip extended, whereupon the extended lip descends onto the floor of the vehicle positioned adjacent thereto permits loading and unloading of the vehicle.

2. The valving as defined in claim 1 including means for causing said lip to automatically retract after the vehicle departs.

3. In the combination of a hydraulic ramp and a control system therefor characterized by an absence of solenoids for use with a vehicle and including a base, a platform having a first end and a second end pivotally mounted on said base at its first end for movement between a generally horizontal position and a position inclined relative thereto, a lip pivotally mounted to said platform at its second end for movement between a retracted position and a generally horizontal extended position, a first hydraulic cylinder connected between said base and said platform for raising said platform from its horizontal position to its inclined position, a second hydraulic cylinder connected between said platform and said lip for extending said lip from its retracted position to its extended position, motor driven pump means for providing a source of high pressure hydraulic fluid for raising said platform and for extending said lip, reservoir means for supplying said motor driven pump with a supply of hydraulic fluid, and valving means for controlling the flow of hydraulic fluid into and out of said first cylinder and said second cylinder to control the movements of said dock ramp, the improvement comprising: said valving means including an inlet passageway connected to said source, an outlet passageway connected to said reservoir, a first connecting passageway connected to said first hydraulic cylinder, and a second connecting passageway connected to said second hydraulic cylinder, said valving means also including a first valve having first closure means for permitting high pressure hydraulic fluid to flow into said first cylinder to raise said platform from its initial position to its inclined position upon admission of said high pressure hydraulic fluid, a biased closed second valve in said second cylinder passage set to open at a predetermined fluid pressure for admitting high pressure fluid into said second cylinder and extending same after said platform reaches its maximum inclined position, second closure means moveable dependently with said first closure means for permitting fluid communication between said first cylinder and said reservoir for permitting said platform to settle and allow said extended lip to rest on the generally horizontal floor of a vehicle to provide a ramp thereto; and an electrical circuit including switch means for starting said motor driven pump means and supplying said high pressure hydraulic fluid to said valving means.

4. In the combination as defined in claim 3, including other switch means in said electrical circuit arranged to start and stop said motor driven pump after said vehicle leaves and said platform settles towards its horizontal position for causing said platform to raise towards its inclined position and settle thereafter; and third closure means moveable dependently with said first closure means for permitting fluid communication between said lip cylinder and said reservoir as said platform raises to thereby permit said lip to settle under its own weight to its retracted position.

5. In the combination as defined in claim 4; wherein said first closure means and second closure means form portions of a spring biased and moveable spool valve.

6. Valving for a hydraulic dock ramp equipped with an extendible lip and having a ramp cylinder for raising said ramp from a lower initial position to an inclined position and a lip cylinder for extending said lip from a retracted position to an extended position for resting on the floor of a truck, said dock ramp also including a motor driven pump and a hydraulic fluid reservoir, said valving comprising: a valve body having an elongate spool valve passageway therein, a high pressure fluid inlet passageway adapted for connection with said motor driven pump and having a first and second branch connecting with said spool valve passageway at first and second spaced apart portions thereof, respectively, a ramp cylinder passageway adapted for connection with said ramp cylinder and intersecting said spool valve passageway between said spaced apart portions for providing a fluid passage from second branch to said ramp cylinder for raising said dock ramp, a reservoir passageway adapted for connection with said reservoir and intersecting said spool valve passageway between the intersection of said ramp cylinder passageway therewith and one said first and second spaced apart portions for providing a fluid passage between said ramp cylinder and said reservoir, and a lip cylinder passageway adapted for connection with said lip cylinder and intersecting said spool valve passageway between its spaced apart portions for providing a fluid passage between said spool valve passageway and said lip cylinder after said dock ramp is raised to permit the extending of said lip; and an elongate spool valve slideably carried in said spool valve passageway between a first and second position and biased toward said first position, said spool valve having a plurality of passageway closure means including first closure means for permitting fluid flow between said reservoir passageway and said ramp cylinder passageway when said spool valve is in its first position and for preventing fluid flow therebetween when said spool valve is in its second position, and second passageway closure means for preventing fluid flow from said second branch and said ramp cylinder when said spool valve is biased to its first position and for permitting restricted flow thereto when said spool valve is biased to its first position; check valve means in said lip cylinder passageway for permitting fluid flow into said lip cylinder after said dock ramp reaches its inclined position; and means biasing the said spool valve to its first position when said motor driven pump is not operating for providing a fluid passage between said reservoir and said ramp cylinder to permit said dock ramp to settle under its own weight, said means being overcome upon operation of said motor driven pump to move said spool valve to its second position thereby forming a passage between said second branch and said ramp cylinder passageway and permitting said ramp to raise.

7. The valving as defined in claim 6, including a lip cylinder drain passageway extending between said lip cylinder inlet passageway and said spool valve passageway for permitting fluid to flow from said lip cylinder into said reservoir when said spool valve is in its second position thereby permitting retraction of said lip, said first closure means preventing fluid communication between said lip cylinder and said reservoir when said spool valve is in its first position, and also including means for closing said lip cylinder drain passageway during extending of said lip.

8. In a hydraulic dock ramp assembly having a platform pivotally mounted to a base at one end and carrying an extendible lip on its opposite end for resting on the floor of a truck for easing the loading and unloading thereof, said dock damp also having a hydraulic system including a pump, a reservoir, a ramp controlling cylinder, and a lip controlling cylinder, said dock ramp also having an electric control circuit including a manually controlled switch and a limit switch for starting and stopping said motor and operating said pump, a valve assembly for controlling the flow of hydraulic fluid, in said hydraulic system, comprising: a valve body; an elongate and cylindrical spool valve passageway contained in said valve body and having first end portions and second end portions; an inlet passageway in said valve body adapted for connection with said pump for admitting high pressure into said valve body, said inlet passageway including a first branch intersecting said spool valve passageway at its first end portions and a second branch intersecting said spool valve passageway near its second end portions; a ramp cylinder passageway in said valve body adapted for connection to said ramp cylinder and intersecting said spool valve passageway between the intersections of said first and second branches therewith for providing a fluid passage from said pump to said ramp cylinder to permit the raising of said cylinder; a reservoir passageway adapted for connection with said reservoir and intersecting said spool valve passageway between the intersection of said first branch and said ramp cylinder passageway therewith for providing fluid communication between said ramp cylinder and said reservoir; a lip cylinder passageway adapted for connection with said lip cylinder and intersecting said spool valve passageway generally between the intersections of said second branch and said reservoir passageway to provide a fluid passage to said lip cylinder and permit the extending of said lip; a check valve in said lip cylinder passageway for permitting fluid flow into said lip cylinder after a predetermined fluid pressure is reached in said spool valve passageway; a lip cylinder drain passageway intersecting said spool valve passageway between the intersections of said first branch and reservoir passageway therewith and also intersecting said lip cylinder passageway to provide drainage of said lip cylinder and permit retraction of said lip; an elongate spool valve slidably contained within said spool valve passageway having a first end and a second end and moveable between a first end generally abutting said first portions and a second position with said second end generally abutting said second portions, said spool valve having a plurality of spaced apart and rigidly connected cylindrical spools dividing said spool valve passageway into a plurality of segments for controlling the flow of hydraulic fluid between said passageways, said spools including a first spool moveable with said spool valve generally between the intersections of said first branch and said lip cylinder drain passageway with said spool valve passageway for sensing the fluid pressure in said inlet passageway but preventing fluid flow from said first branch into other of said passageways, a second spool moveable with said spool valve generally from a position between said lip cylinder drain passageway and said reservoir passageway to a position generally between said reservoir passageway and said ramp cylinder passageway to selectively provide a fluid passage between said reservoir and one of said lip drain cylinder passageway and said ramp cylinder passageway, and a third spool moveable with said spool valve from a position closing off said second branch from said spool valve passageway to a position at least partially opening same for causing the high pressure fluid in said inlet passageway to flow into said ramp cylinder at a reduced pressure; spring means biasing said spool valve towards its first position to permit free communication of fluid between said ramp cylinder and said reservoir when said motor is not operating; and interconnecting passageway connecting the second end portions of said spool valve passageway with said ramp cylinder passageway for exerting fluid pressure on the second end of said spool valve and creating a differential force in combination with the fluid pressure on the first end of said spool valve when said motor is running for overcoming the bias of said spring and causing said spool valve to move to its second position to thereby permit fluid flow into said ramp cylinder and permit free fluid communication between said lip cylinder and said reservoir; and means in said lip cylinder passageway for closing off fluid communication between same and said lip cylinder drain passageway after said ramp reaches its uppermost inclined position and fluid begins flowing through said lip cylinder passageway and into said lip cylinder for extending said lip.

9. The control valve assembly as defined in claim 7, wherein said means comprise a slideable tubular member biased to a position permitting free fluid communication between said lip cylinder passageway and said lip cylinder drain passageway when there is no flow through said check valve, said member being moveable responsively to flow therethrough to close said last mentioned passageways.

References Cited
UNITED STATES PATENTS

| | | | |
|---|---|---|---|
| 2,714,735 | 8/1955 | Watson | 14—71 |
| 2,881,457 | 4/1959 | Rodgers | 14—71 |
| 2,993,219 | 7/1961 | Pennington | 14—71 |
| 3,201,814 | 8/1965 | Le Clear | 14—71 |
| 3,290,709 | 12/1966 | Whitenack | 14—71 |
| 3,290,710 | 12/1966 | Whitenack | 14—71 |

ERNEST R. PURSER, *Primary Examiner.*

NILE C. BYERS, JR., *Examiner.*